United States Patent
Proctor, Jr. et al.

(10) Patent No.: US 8,542,623 B2
(45) Date of Patent: *Sep. 24, 2013

(54) USE OF RF REFERENCE IN A DIGITAL BASEBAND INTERFERENCE CANCELLATION REPEATER

(75) Inventors: James A. Proctor, Jr., Melbourne Beach, FL (US); Kenneth M. Gainey, Satellite Beach, FL (US); Dhananjay Ashok Gore, San Diego, CA (US); Gwendolyn Denise Barriac, Encinitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 416 days.

This patent is subject to a terminal disclaimer.

(21) Appl. No.: 12/686,608

(22) Filed: Jan. 13, 2010

(65) Prior Publication Data

US 2011/0170473 A1    Jul. 14, 2011

(51) Int. Cl.
    *H04J 1/10* (2006.01)
(52) U.S. Cl.
    USPC .......................................... 370/315
(58) Field of Classification Search
    USPC .............. 370/315, 274, 492, 316, 317, 501, 370/277, 278, 282, 286, 293, 243, 226, 328, 370/329, 330, 331, 338, 339, 341, 349, 389, 370/471
    See application file for complete search history.

(56) References Cited

U.S. PATENT DOCUMENTS

| | | |
|---|---|---|
| 7,020,436 B2 | 3/2006 | Schmutz |
| 7,050,758 B2 | 5/2006 | Dalgleish et al. |
| 7,355,993 B2 | 4/2008 | Adkins et al. |
| 7,406,300 B2 | 7/2008 | Pan |
| 7,627,287 B2 | 12/2009 | Moss |
| 2002/0045461 A1 | 4/2002 | Bongfeldt |
| 2003/0123401 A1 | 7/2003 | Dean |
| 2008/0064354 A1 | 3/2008 | Lee et al. |
| 2008/0125033 A1 | 5/2008 | Lee et al. |
| 2008/0225929 A1 | 9/2008 | Proctor et al. |
| 2009/0061766 A1 | 3/2009 | Ding et al. |
| 2009/0093212 A1 | 4/2009 | Shimizu et al. |
| 2010/0009625 A1 | 1/2010 | Chami et al. |
| 2010/0284280 A1 | 11/2010 | Gore et al. |

(Continued)

FOREIGN PATENT DOCUMENTS

| | | |
|---|---|---|
| CN | 201332396 Y | 10/2009 |
| EP | 2053812 A2 | 4/2009 |

(Continued)

OTHER PUBLICATIONS

International Search Report and Written Opinion—PCT/US2011/021183—ISA/EPO—May 30, 2011.

(Continued)

*Primary Examiner* — Chi Pham
*Assistant Examiner* — Alexander O Boakye
(74) *Attorney, Agent, or Firm* — Jennifer M. Pascua (57) ABSTRACT

A wireless repeater includes an echo canceller to cancel an estimated feedback amount from an input signal and a reference receiver to sample a portion of the transmit signal prior to over-the-air transmission for use as the reference signal for channel estimation. More accurate channel estimation is obtained by using the reference signal from the reference receiver as the reference signal accounts for distortions in the transmitter circuit of the repeater.

22 Claims, 6 Drawing Sheets

(56) References Cited

U.S. PATENT DOCUMENTS

| | | |
|---|---|---|
| 2010/0285737 A1 | 11/2010 | Gore et al. |
| 2012/0002586 A1* | 1/2012 | Gainey et al. ................ 370/315 |
| 2013/0077502 A1 | 3/2013 | Gainey et al. |
| 2013/0077556 A1 | 3/2013 | Gore et al. |

FOREIGN PATENT DOCUMENTS

| | | |
|---|---|---|
| KR | 20080102066 A | 11/2008 |
| WO | 2004077688 A2 | 9/2004 |
| WO | WO2009014281 A1 | 1/2009 |
| WO | 2011087040 A1 | 7/2011 |

OTHER PUBLICATIONS

Ito Y. et al., "Novel Repeater with Automatic Gain-Control for Indoor Area". 2005 Asia-Pacific Microwave Conference, Dec. 4-7, 2005, Suzhou, China. 3 pp., 2006. ISBN-10: 07803 9433 X.

* cited by examiner

USE OF RF REFERENCE IN A DIGITAL BASEBAND INTERFERENCE CANCELLATION REPEATER

BACKGROUND

1. Field

This disclosure generally relates to repeaters in wireless communication systems.

2. Background

Wireless communication systems and techniques have become an important part of the way we communicate. However, providing coverage can be a significant challenge to wireless service providers. One way to extend coverage is to deploy repeaters.

Figure 1:
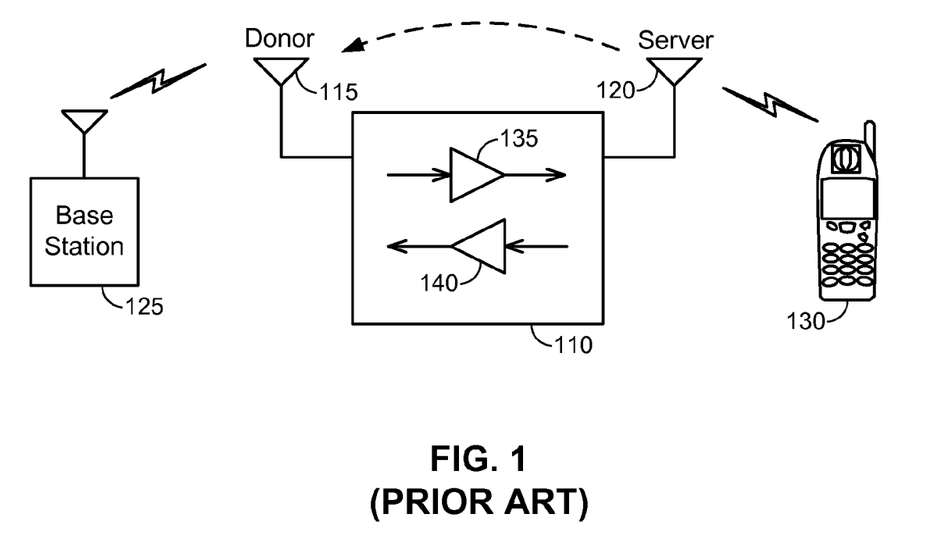
FIG. 1 is a simplified diagram of a repeater according to the prior art.

In general, a repeater is a device that receives a signal, amplifies the signal, and transmits the amplified signal. FIG. 1 shows a basic diagram of a repeater 110, in the context of a cellular telephone system. Repeater 110 includes a donor antenna 115 as an example network interface to network infrastructure such as a base station 125. Repeater 110 also includes a server antenna 120 (also referred to as a "coverage antenna") as a mobile interface to mobile device 130. In operation, donor antenna 115 is in communication with base station 125, while server antenna 120 is in communication with mobile devices 130.

Signals from base station 125 are amplified using forward link circuitry 135, while signals from mobile device 130 are amplified using reverse link circuitry 140. Many configurations may be used for forward link circuitry 135 and reverse link circuitry 140.

There are many types of repeaters. In some repeaters, both the network and mobile interfaces are wireless; while in others, a wired network interface is used. Some repeaters receive signals with a first carrier frequency and transmit amplified signals with a second different carrier frequency, while others receive and transmit signals using the same carrier frequency. For "same frequency" repeaters, one particular challenge is managing the feedback that occurs since some of the transmitted signal can leak back to the receive circuitry and be amplified and transmitted again.

Existing repeaters manage feedback using a number of techniques; for example, the repeater is configured to provide physical isolation between the two antennae, filters are used, or other techniques may be employed.

SUMMARY

Systems, apparatuses, and methods disclosed herein allow for enhanced repeater capability. According to one embodiment of the present invention, a wireless repeater has a first antenna and a second antenna to receive an input signal and transmit an amplified signal where the input signal is a sum of a remote signal to be repeated and a feedback signal resulting from a feedback channel between the first antenna and the second antenna. The repeater includes a first receiver circuit coupled to the first antenna to receive the input signal and generating a digitized input signal, a first transmitter circuit coupled to generate the amplified signal to transmit on the second antenna based on a digitized transmit signal, a second receiver circuit coupled to receive at least a portion of a signal to be transmitted prior to transmission over the second antenna and to generate a digitized transmit reference signal, and a repeater baseband block coupled to the first receiver circuit, the second receiver circuit, and the first transmitter circuit. The repeater baseband block is operative to receive the digitized input signal from the first receiver circuit, to access a feedback signal estimate, and to cancel the feedback signal estimate from the digitized input signal to generate the digitized transmit signal for the first transmitter circuit. Furthermore, the repeater baseband block includes a channel estimation block to estimate the feedback channel and to provide a feedback channel estimate where the channel estimation block uses the digitized transmit reference signal as a reference signal for channel estimation.

According to another aspect of the present invention, a method for providing echo cancellation in a wireless repeater in a wireless communication system includes receiving an input signal at a first antenna of the repeater where the input signal is a sum of a remote signal to be repeated and a feedback signal resulting from a feedback channel between the first antenna and a second antenna, generating a digitized input signal, cancelling a feedback signal estimate from the digitized input signal, generating a digitized transmit signal based on the digitized input signal, generating an amplified signal based on the digitized transmit signal, transmitting the amplified signal on the second antenna, receiving at least a portion of a signal to be transmitted prior to transmission over the second antenna and generating a digitized transmit reference signal, and estimating a feedback channel between the first antenna and the second antenna using the digitized transmit reference signal as a reference signal for channel estimation and providing a feedback channel estimate.

DETAILED DESCRIPTION

The nature, objectives, and advantages of the disclosed method and apparatus will become more apparent to those skilled in the art after considering the following detailed description in connection with the accompanying drawings.

Prior art repeaters such as those described above may provide significant advantages for cellular telephone or similar networks. However, existing repeater configurations may not be suitable for some applications. For example, existing repeater configurations may not be suitable for indoor coverage applications (e.g., repeating signals for a residence or business environment) which may require substantially more isolation between the repeater's antennas. Moreover, in some traditional repeater implementations, the target is to achieve as high a gain as reasonable while maintaining a stable feedback loop (loop gain less than unity). However, increasing the repeater gain renders isolation more difficult due to the increased signal leaking back into the donor antenna. In general, loop stability demands require that the signal leaking back into the donor antenna from the coverage antenna be much lower than the remote signal (the signal to be repeated). Thus, to ensure stability, a repeater's gain is traditionally limited to less than the isolation from the server antenna to the donor antenna, by some margin. When the gain of a traditional repeater exceeds its isolation, a positive feedback condition occurs resulting in oscillation. High gain and improved isolation form two contradicting demands required for modern day repeaters, especially those for indoor applications.

In some traditional repeaters, interference cancellation or echo cancellation is used to improve the isolation between the repeaters' donor and coverage antennas. Digital baseband interference cancellation is often employed in traditional repeaters to realize active isolation in the repeater, enabling the ability to achieve higher overall isolation and higher gain. Conventional digital baseband interference cancellation or echo cancellation is implemented by using samples of the transmit signal, in digital baseband, in conjunction with samples of the receive signals, also in digital baseband, to estimate the feedback channel (or the "leakage channel") between the donor antenna and the server antenna. The feedback channel estimate is then used to generate an estimated feedback signal, also referred to as the "estimated leakage signal." The estimated leakage signal is then subtracted from the receive signal to actively cancel the interference, thereby allowing higher gain to be used while preventing oscillation. Effective echo cancellation requires very accurate channel estimation. In general, the more accurate the channel estimate, the higher the cancellation and hence the higher the effective isolation. Herein, "interference cancellation" or "echo cancellation" refers to techniques that reduce or eliminate the amount of leakage signal between repeater antennas; that is, "interference cancellation" refers to cancellation of an estimated leakage signal, which provides for partial or complete cancellation of the actual leakage signal.

However, real world impairments in practical receiver and transmitter circuitry of the repeater limit the performance of conventional interference cancellation approaches. Furthermore, the echo cancellation performance requirements for repeaters often exceed the typical capability of commodity components. To meet the desired echo cancellation performance requirements, high performance components have to be used, driving the cost of the transceiver components in repeaters to an unacceptable level.

Systems and techniques herein provide for repeaters employing interference cancellation or echo cancellation to improve the isolation between the repeaters' donor antenna ("the receiving antenna" for the example of a forward link transmission) and the coverage antenna ("the transmitting antenna" for forward link transmissions). More specifically, in some embodiments, systems and techniques herein provide for a repeater employing interference cancellation using the RF transmit signal as the reference signal to improve the accuracy of the channel estimation. In some embodiments, the interference cancellation or echo cancellation is implemented using the RF transmitted signal as the reference signal for channel estimation. By using the RF transmit signal as the reference signal instead of the digital baseband transmit signal, distortions to the transmit signal due to the transmitter circuitry of the repeater are accounted for and cancelled out as part of the estimated feedback signal. Accordingly, the requirements on the performance of the RF transmitter components in the repeater can be relaxed and the manufacturing cost of the repeater is reduced.

Figure 2:
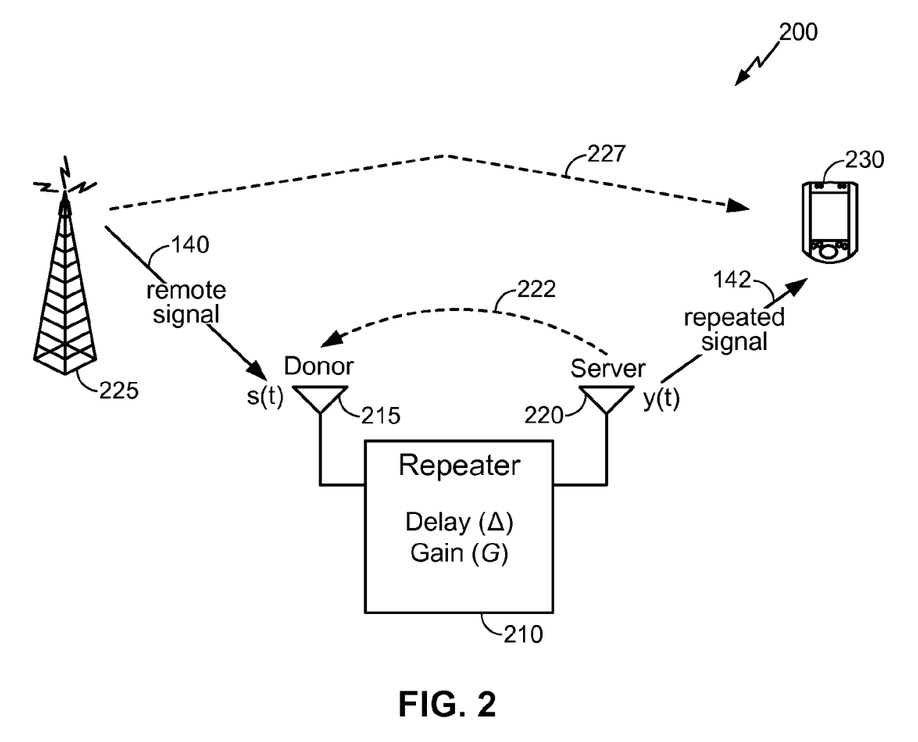
FIG. 2 shows a diagram of a repeater environment according to some embodiments of the current disclosure.

FIG. 2 shows a diagram of an operating environment 200 for a repeater 210 according to embodiments of the current disclosure. The example of FIG. 2 illustrates forward link transmissions; i.e., a remote signal 140 from a base station 225 is intended for a mobile device 230. A repeater, such as repeater 210, may be used in environment 200 if an unrepeated signal along the path 227 between base station 225 and mobile device 230 would not provide sufficient signal for effective voice and/or data communications received at mobile device 230. Repeater 210 with a gain G and a delay Δ is configured to repeat a signal received from base station 225 on a donor antenna 215 to mobile device 230 using a server antenna 220. Repeater 210 includes forward link circuitry for amplifying and transmitting signals received from the base station 225 to mobile device 230 through donor antenna 215 and server antenna 220. Repeater 210 may also include reverse link circuitry for amplifying and transmitting signals from mobile device 230 back to base station 225. At repeater 210, the remote signal s(t) is received as an input signal and the remote signal s(t) is repeated as a repeated or amplified signal y(t) where $y(t)=\sqrt{G}s(t-\Delta)$. Ideally, the gain G would be large, the delay Δ of the repeater would be small, the input SINR would be maintained at the output of repeater 210 (this can be of particular importance for data traffic support), and only desired carriers would be amplified.

In practice, the gain of repeater 210 is limited by the isolation between donor antenna 215 and server antenna 220. If the gain is too large, the repeater can become unstable due to signal leakage. Signal leakage refers to the phenomenon where a portion of the signal that is transmitted from one antenna (in FIG. 2, server antenna 220) is received by the other antenna (in FIG. 2, donor antenna 215), as shown by the feedback path 222 in FIG. 2. Without interference cancellation or other techniques, the repeater would amplify this feedback signal, also referred to as the "leakage signal," as part of its normal operation, and the amplified feedback signal would again be transmitted by server antenna 220. The repeated transmission of the amplified feedback signal due to signal leakage and high repeater gain can lead to repeater instability. Additionally, signal processing in repeater 210 has an inherent non-negligible delay Δ. Moreover, the output SINR of the repeater is dependent on non-linearities in the transceiver circuitry and in other signal processing functions. Thus, the aforementioned ideal repeater operational characteristics are often not attained. Finally, in practice, the desired carriers can vary depending on the operating environment or market in which the repeater is deployed. It is not always possible to provide a repeater that amplifies only the desired carriers.

The communication system in which the repeater of the present invention can be deployed includes various wireless communication networks based on infrared, radio, and/or microwave technology. Such networks can include, for example, a wireless wide area network (WWAN), a wireless local area network (WLAN), a wireless personal area network (WPAN), a WiMAX network and so on. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as CDMA2000, Wideband-CDMA (W-CDMA), and so on. CDMA2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). CDMA2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The systems and techniques described herein may also be used for any combination of WWAN, WLAN and/or WPAN.

Figure 3:
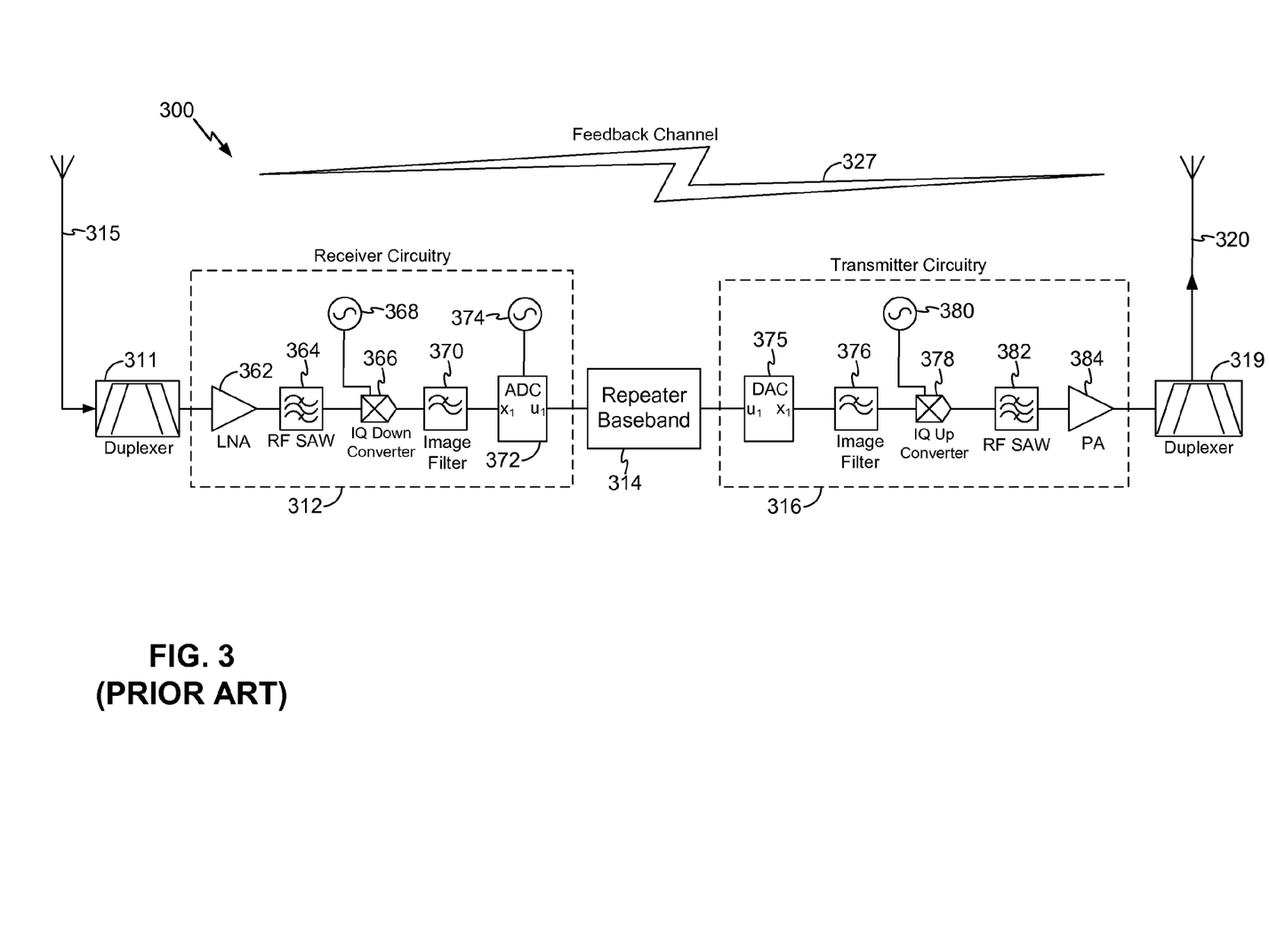
FIG. 3 is a schematic diagram of a conventional digital baseband interference cancellation repeater illustrating the receiver and transmitter circuitry of the repeater.

FIG. 3 is a schematic diagram of a conventional digital baseband interference cancellation repeater illustrating the receiver and transmitter circuitry of the repeater. For simplicity, FIG. 3 illustrates only the forward link circuitry of a repeater 300 for receiving a remote signal on a donor antenna 315 and transmitting the amplified signal on a server antenna 320. The reverse link circuitry for transmission in the reverse direction is omitted but it is understood that the repeater contains both forward link and reverse link circuitry for complete repeater functionality. In the illustration in FIG. 3, donor antenna 315 is shown coupled to a duplexer 311 operative to connect the donor antenna to either a receiver circuit for receiving forward link communications or to a transmitter circuit (not shown) for transmitting reverse link communications. Similarly, server antenna 320 is shown coupled to a duplexer 319 operative to connect the server antenna to either a transmitter circuit for transmitting forward link communications or to a receiver circuit (not shown) for receiving reverse link communications. In the present illustration, only the forward link circuitry of the repeater is shown and therefore duplexer 311 is shown coupled only to a receiver circuit and duplexer 319 is shown coupled only to a transmitter circuit. However, it is understood that in actual implementation, duplexers 311 and 319 each connects to a receiver circuit and a transmitter circuit to enable bi-directional (duplex) communication over the communication channel.

As shown in FIG. 3, a receiver circuitry 312 (also referred to as the "receiver") receives from duplexer 311 a receive signal (sometimes referred to as "an input signal") being the remote signal to be amplified plus any feedback signal from the feedback channel. In the present illustration, receiver 312 is implemented as a direct-conversion receiver or a zero-IF receiver. Receiver 312 includes a low noise amplifier 362, an RF SAW filter 364, an IQ down-converter 366 driven by a local oscillator 368, an image filter 370, and finally an analog-to-digital converter 372 driven by a local oscillator 374 to digitize the incoming signal. The digitized signal is coupled to a repeater baseband block 314. Repeater baseband block 314 performs echo cancellation and signal amplification of the receive signal. Repeater baseband block 314 generates an echo cancelled digital transmit signal to be transmitted as the amplified signal on the server antenna 320. A transmitter circuit 316 (also referred to as the "transmitter") receives the digital transmit signal which is a digital baseband signal. Transmitter 316 includes a digital-to-analog converter 375, an image filter 376, an IQ up-converter 378 driven by a local oscillator 380, an RF SAW filter 382 and a power amplifier (PA) 384. Transmitter 316 generates the RF transmit signal from the digital transmit signal and provides the RF transmit signal to duplexer 319 to be transmitted on antenna 320. In conventional repeater 300, channel estimation is performed in repeater baseband block 314 using the signals generated within the repeater baseband block as the reference signal for channel estimation.

Figure 4:
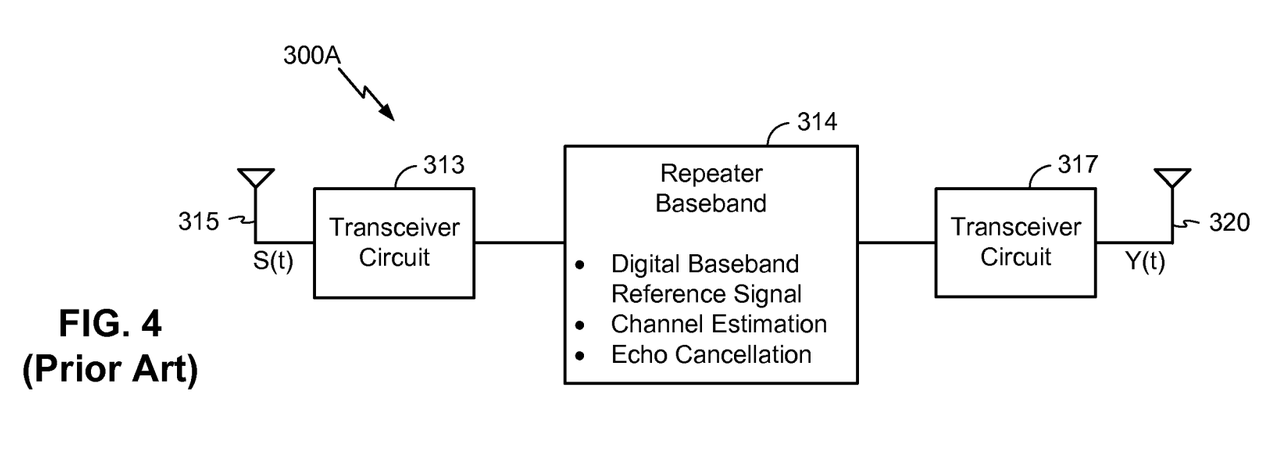
FIG. 4 is a simplified block diagram of the repeater of FIG. 3 and illustrates the transceiver implementation in the repeater for forward link and reverse link transmission.

FIG. 4 is a simplified block diagram of the repeater of FIG. 3 and illustrates the transceiver implementation in the repeater for forward link and reverse link transmission. Referring to FIG. 4, repeater 300A includes a transceiver circuit 313 coupled to donor antenna 315 and a transceiver circuit 317 coupled to server antenna 320. Transceiver circuits 313, 317 each includes receiver and transmitter circuitry for implementing forward link and reverse link communications. Duplexers are used to connect the respective antenna alternately to the receiver and transmitter circuitry associated with each antenna for forward link and reverse line transmissions.

Repeater 300A implements digital baseband interference cancellation by using the digital transmit signal generated in the repeater baseband block 314 as the reference signal for channel estimation. More specifically, the channel estimation and echo cancellation functions of repeater 300A are implemented in the repeater baseband block 314 which operates in the digital domain. In repeater baseband block 314, the feedback channel is estimated using digital samples of the transmit signal as the reference signal and also using digital samples of the receive signal. The channel estimate is then used to estimate the feedback signal using the digital samples of the transmit signal. The estimated feedback signal is then used to cancel out the undesired feedback signal in the receive signal, thereby providing active isolation and improving stability.

However, impairments in the transmitter circuitry of repeater 300 or repeater 300A limit the interference cancellation performance. More specifically, the transmitter circuitry introduces distortions into the RF transmit signal. The distortions can include quantization noise from the digital-to-analog converter (DAC) 375, phase noise from the local oscillator 380, IQ imbalance and linearity errors from IQ up converter 378, inter-channel interference (ICI) or inter-signal interference (ISI) from the RF SAW filter 382 and finally, non-linearity errors from the power amplifier 384. These transmitter distortions limit performance of the conventional repeater and add significant implementation cost if the performance limitations are to be overcome through transmitter circuit modifications.

RF Reference for Interference/Echo Cancellation

Figure 5:
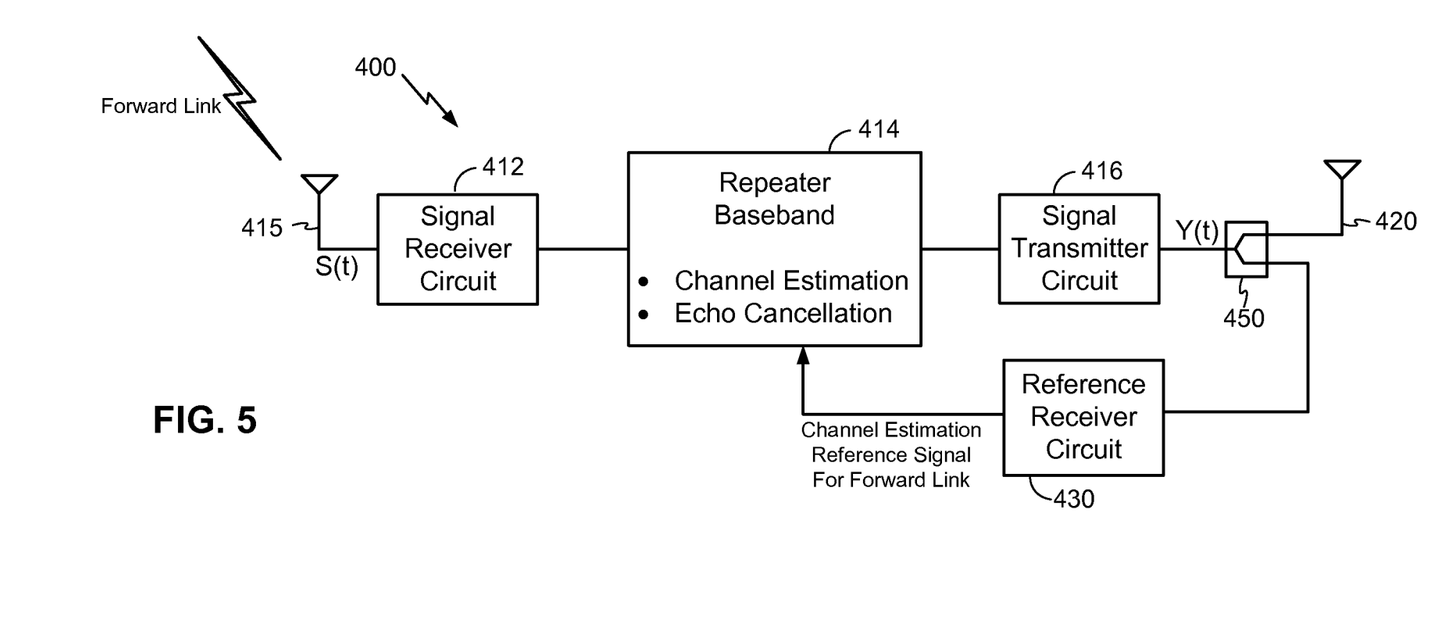
FIG. 5 is a block diagram of a repeater implementing interference cancellation using a RF reference according to one embodiment of the present invention.

In some embodiments, a repeater employing echo cancellation uses an RF transmit signal as the reference signal for channel estimation. FIG. 5 is a block diagram of a repeater implementing interference cancellation using an RF reference according to one embodiment of the present invention. Referring to FIG. 5, a repeater 400 includes a donor antenna 415 coupled to a receiver circuit 412 and a server antenna 420 coupled to a transmitter circuit 416. Receiver 412 and transmitter 416 implements forward link communications in repeater 400 where antenna 415 receives the remote signal S(t) and antenna 420 transmits the amplified signal Y(t). In the present illustration, repeater 400 is shown with only the forward link circuitry and the reverse link circuitry for transmission in the reverse direction is omitted for simplicity. It is understood that repeater 400 may contain both forward link and reverse link circuitry to enable transmissions in both the forward and reverse link directions. Receiver 412 of repeater 400 receives a receive signal being the sum of the remote signal to be amplified plus the feedback signal (or the leakage signal) resulted from the feedback channel between the donor and server antenna. Repeater 400 also includes a repeater baseband block 414 for processing the receive signal, such as performing channel estimation, echo cancellation and signal amplification.

In the present discussion, receiver circuit 412 is sometimes referred to as a "signal receiver" and transmitter circuit 416 is sometimes referred to as a "signal transmitter" to indicate that receiver circuit 412 is used to receive the desired remote signal and transmitter circuit 416 is used to transmit the desired amplified signal.

According to one aspect of the present invention, repeater 400 includes a reference receiver circuit 430 for receiving the RF transmit signal prior to over-the-air transmission. In the present embodiment, reference receiver 430 samples the RF transmit signal through a splitter 450 coupled to the output of signal transmitter 416. Reference receiver 430 generates a digital baseband signal based on the RF transmit signal for use by the repeater baseband block 414 as the reference signal for channel estimation. It is instructive to note that reference receiver 430 for receiving the RF transmit signal Y(t) is separate from the signal receiver 412 which is used to receive the incoming remote signal S(t) in the forward link. In the present embodiment, splitter 450 is used to enable reference receiver 430 to sample the RF transmit signal at the server antenna 420. In other embodiments, other techniques, such as a directional coupler, to sample the output of the transmitter and feed back a portion of the transmitted signal to the reference receiver can be used.

In the present embodiment, the reference signal generated by reference receiver 430 is used for channel estimation for forward link communications. As thus constructed, the reference signal derived from the RF transmit signal will include distortions caused by the transmitter circuit 416. These distortions are then accounted for in the channel estimation and echo cancellation process so that improved interference cancellation performance is attained without requiring the use of costly non-commodity components. More specifically, using the RF transmit signal as the reference signal for channel estimation rather than using a digital baseband reference signal generated in the repeater baseband block will allow the channel estimation reference signal to include distortions due to the transmitter circuit. As discussed above, the transmitter distortion can include such as DAC quantization noise, phase noise, IQ imbalance and linearity errors, ICI and ISI noise, and power amplifier non-linearity errors. Because these transmitter distortions are included in the reference signal sampled by the reference receiver, the transmitter distortions will be cancelled out as part of the leakage signal. When the transmitter distortions can be thus removed, the requirements placed upon the RF transmitter components in the interference cancellation repeater are relaxed, allowing for use of low cost commodity components, thereby reducing manufacturing cost. Furthermore, in some embodiments, use of the RF transmit signal as the channel estimation reference signal has been shown to improve the SNR (signal-to-noise ratio) of the repeated signal by 8 to 10 dB, and the output power by at least 10 dB due to the reduced linearity requirements.

In the present illustration, reference receiver 430 is a dedicated receiver for receiving the RF transmit signal at antenna 420 prior to over-the-air transmission in the forward link. In other embodiments, repeater 400 includes the reverse link circuitry for receiving reverse link communications on antenna 420. In that case, a signal receiver is coupled to antenna 420 and a signal transmitter is coupled to antenna 415. A second reference receiver would be coupled through a splitter or directional coupler to antenna 415 to receive the RF transmit signal at antenna 415 prior to over-the-air transmission over the reverse link. The second reference receiver generates a digital baseband signal based on the RF transmit signal sampled at antenna 415. In this manner, channel estimation and echo cancellation of the reverse link is realized. Furthermore, echo cancellation for the forward link and the reverse link are typically provided separately in separate baseband blocks. In essence, FIG. 5 illustrates the receiver, baseband block and transmitter for the forward link transmission and the circuitry are duplicated in the repeater for the reverse link transmission.

When repeater 400 is constructed with both forward link and reverse link circuitry, reference receiver 430 is a separate receiver from signal receiver 412 for receiving the forward link remote signal and is also a separate receiver from the signal receiver associated with antenna 420 for receiving the reverse link remote signal. Similarly, the second reference receiver is a separate receiver from signal receiver 412 for receiving the forward link remote signal and is also a separate receiver from the signal receiver associated with antenna 420 for receiving the reverse link remote signal.

Figure 6:
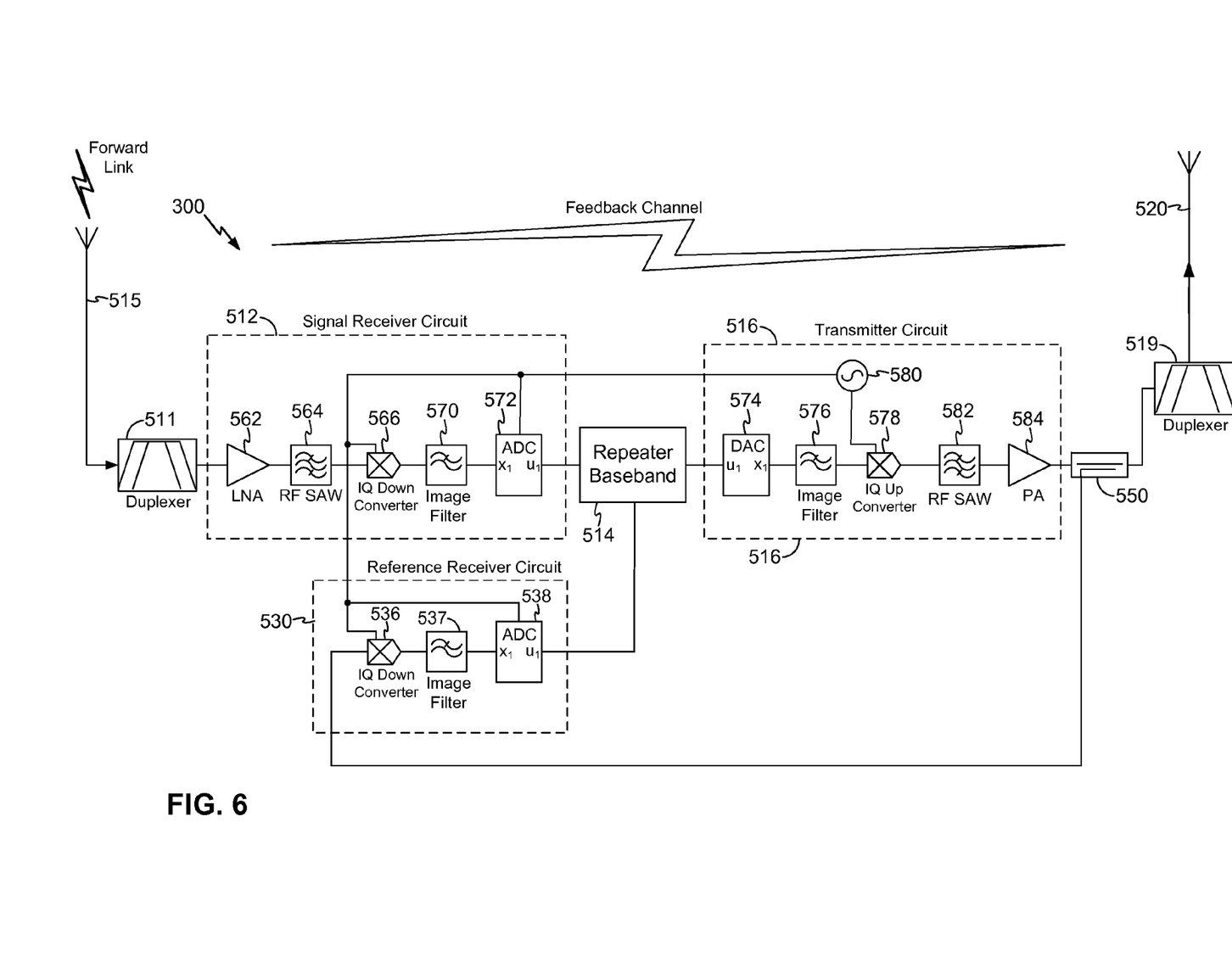
FIG. 6 is a detailed schematic diagram of a repeater implementing interference cancellation using a RF reference according to an alternate embodiment of the present invention.

FIG. 6 is a detailed schematic diagram of a repeater implementing interference cancellation using a RF reference according to an alternate embodiment of the present invention. Referring to FIG. 6, a repeater 500 includes a donor antenna 515 connected to a duplexer 511 and a server antenna 520 connected to a duplexer 519. In the present illustration, only the forward link circuitry of repeater 500 for receiving a remote signal on donor antenna 515 and transmitting the amplified signal on a server antenna 520 is shown. The reverse link circuitry for transmission in the reverse direction is omitted in the present embodiment but it is understood that the repeater contains both forward link and reverse link circuitry for complete repeater functionality. In FIG. 6, donor antenna 515 is shown coupled to duplexer 511 operative to connect the donor antenna to either a receiver circuit for receiving forward link communications or to a transmitter circuit (not shown) for transmitting reverse link communications. Similarly, server antenna 520 is shown coupled to duplexer 519 operative to connect the server antenna to either a transmitter circuit for transmitting forward link communications or to a receiver circuit (not shown) for receiving reverse link communications. It is understood that duplexers 311 and 319 each connects to a receiver circuit and a transmitter circuit to enable bi-directional (duplex) communication over the communication channel.

Repeater 500 includes a receiver circuit 512, a repeater baseband block 514 and a transmitter circuit 516. Receiver 512 receives an input signal from duplexer 511. The signal received at receiver 512 is referred to as the receive signal (or the "input signal") and includes the remote signal to be amplified as well as any feedback signal from the feedback channel. In the present embodiment, receiver 512 is implemented as a direct-conversion receiver or a zero-IF receiver. Receiver 512 includes a low noise amplifier 562 for amplifying the receive signal, an RF SAW filter 564 for filtering the receive signal, an IQ down-converter 566 to demodulate the receive signal, an image filter 570 to filter out the image frequency and finally an analog-to-digital converter 572 to digitize the incoming signal. The digitalized signal is coupled to a repeater baseband block 514. Repeater baseband block 514 performs echo cancellation and amplification of the input signal. Repeater baseband block 514 generates a digital transmit signal to be transmitted as the amplified signal on the server antenna 520. A transmitter circuit 516 (also referred to as the "transmitter") receives the digital transmit signal which is a digital baseband signal. In the present embodiment transmitter 516 is implemented as a direct-conversion transmitter. Transmitter 516 includes a digital-to-analog converter 574 to convert the digital transmit signal to the analog RF transmit signal, an image filter 576 for removing the image frequency, an IQ up-converter 578 driven by a local oscillator 580 to up-convert the analog transmit signal to the RF transmit signal, an RF SAW filter 582 to filter the RF transmit signal and a power amplifier (PA) 584 for amplifying the RF transmit signal. Transmitter 516 generates the RF transmit signal from the digital transmit signal and provides the RF transmit signal to duplexer 519 to be transmitted on antenna 520.

Repeater 500 includes a reference receiver 530 coupled to receive the RF transmit signal prior to the transmit signal being coupled to over-the-air transmission. In the present embodiment, a directional coupler 550 is used to sample the output of transmitter 516 and feed back a portion of the sampled signal to reference receiver 530. In other embodiments, a splitter or other techniques to sample the output of the transmitter and feed back a portion of the signal to the reference receiver can be used.

In the present embodiment, reference receiver 530 mirrors the construction of signal receiver 512. More specifically, reference receiver 530 includes an IQ down-converter 536, an image filter 537 and an analog-to-digital converter 538. Reference receiver 530 does not duplicate all components of the zero-IF receiver because the RF transmit signal is sampled prior to over-the-air transmission and thus not all receiver elements are necessary to receive the sampled signal. For instance, the sampled signal coupled back from the directional coupler 550 does not need to be amplified because the RF transmit signal was just amplified by the transmitter circuit 516 prior to the directional coupler 550. Thus, the low noise amplifier element can be omitted. Also, the sampled signal would be in the correct frequency band and thus an RF SAW filter for band-limiting the sampled signal is not necessary.

Reference receiver 530 takes the RF transmit signal and converts the RF transmit signal into digital samples which are then provided to repeater baseband block 514 as the reference signal for channel estimation. Repeater baseband block 514 uses the digital samples of the RF transmit signal in estimating the feedback channel. The estimated feedback channel is then used in cancelling out the feedback signal in the receive signal to implement echo cancellation. By using an RF reference signal just prior to over-the-air transmission, distortions due to circuitry in the transmitter 516 is accounted for in the interference cancellation operation.

According to another aspect of the present invention, phase noise in the feedback signal is removed by using a common local oscillator. More specifically, in the conventional repeater shown in FIG. 3, the IQ down-converter 366 and the ADC 372 in the receiver circuit, and the IQ up-converter 378 in the transmitter circuit are all driven by individual local oscillators. Using separate local oscillators to drive these receiver and transmitter leads to phase noise error. However, in the present embodiment of FIG. 6, repeater 500 uses the same local oscillator 580 to drive the IQ up-converter 578 in transmitter 516, the IQ down-converter 566 and the ADC 572 in the signal receiver 512, and the IQ down-converter 536 and the ADC 538 in the reference receiver 530. By using the same local oscillator to drive the IQ down-converters, IQ up-converters and ADCs, phase noise in the feedback signal is canceled out together with other transmitter distortions through the use of the RF transmit signal.

In FIG. 6, a direct conversion receiver or zero-IF receiver architecture is used to implement the receiver circuit. In other embodiments, other receiver architecture can be used in the repeater of the present invention. The exact implementation of the receiver architecture is not critical to the practice of the present invention. It is only necessary that the reference receiver mirrors the construction of the signal receiver so as not to introduce another variable in generating the reference signal. In one alternate embodiment, a superheterodyne receiver using a intermediate frequency lower than the remote signal is used.

In the above described embodiments, the RF transmit signal is sampled from the last stage of the transmitter circuit. That is, the RF transmit signal is sampled at a point after the power amplifier 584. In other embodiments of the present invention, the RF transmit signal can be taken at other stages in the transmitter circuit after the digital-to-analog converter. For instance, the RF transmit signal can be taken before the power amplifier or before the RF SAW filter. The RF transmit signal is sampled at these earlier stages by the use of a direction coupler or a splitter or other techniques to sample the transmit signal and feed back a portion of the signal to the reference receiver, as described above. Of course, when the RF transmit signal is taken from a point including less than all the transmitter components, then distortions associated with those components would not be accounted for in the channel estimation and echo cancellation process. Therefore, it is advantageous to sample the RF signal at a point after the last transmitter component (such as the power amplifier 584) so that distortions associated with all of the transmitter circuitry are accounted for. However, it is possible to sample the RF transmit signal at an earlier point in the transmitter circuit as long as the distortion contribution of the remaining components is not significant.

Figure 7:
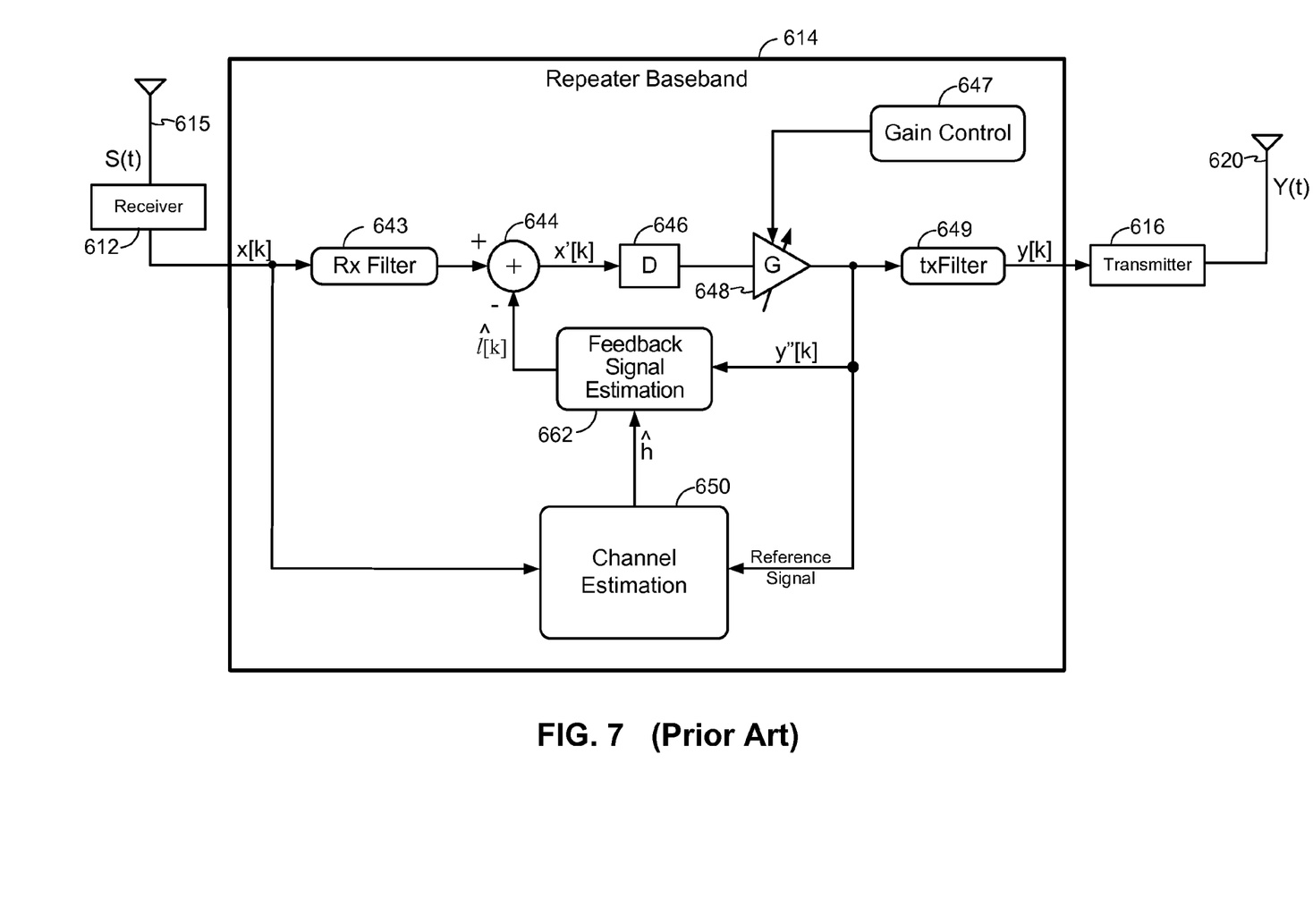
FIG. 7 is a block diagram of a conventional repeater baseband block.

FIG. 7 is a block diagram of a conventional repeater baseband block. Referring to FIG. 7, in repeater baseband block 614, the digitized receive signal x[k] is coupled to a receive filter 643 and then to a summer 644 forming part of the echo-canceller for subtracting a feedback channel estimate from the receive signal. The echo-cancelled signal x'[k] is delayed by a delay element 646 and then amplified by a variable gain stage 648 controlled by a gain control block 647. The amplified, echo-cancelled signal y"[k] (also referred to as the "digital transmit signal") is coupled to a transmit filter 649 to generate the digital baseband transmit signal y[k]. In the conventional repeater baseband block, channel estimation is carried out using the digital transmit signal y"[k] as the reference signal. To that end, a channel estimation block 650 receives the digital transmit signal y"[k] as the reference signal and also receives the receive signal x[k]. A channel estimate $\hat{h}$ is generated and provided to the echo-canceller to generate a feedback signal estimate. In repeater baseband block 614, the echo-canceller includes a feedback signal estimation block 662 where the channel estimate $\hat{h}$, the digital transmit signal y"[k] are used to generate the feedback signal estimate $\hat{I}[k]$. More specifically, the channel estimate $\hat{h}$ is convolved with the digital transmit signal y"[k] to generate the feedback signal estimate $\hat{I}[k]$. The feedback signal estimate $\hat{I}[k]$ is coupled to summer 644 to be subtracted from the receive signal x[k].

Figure 8:
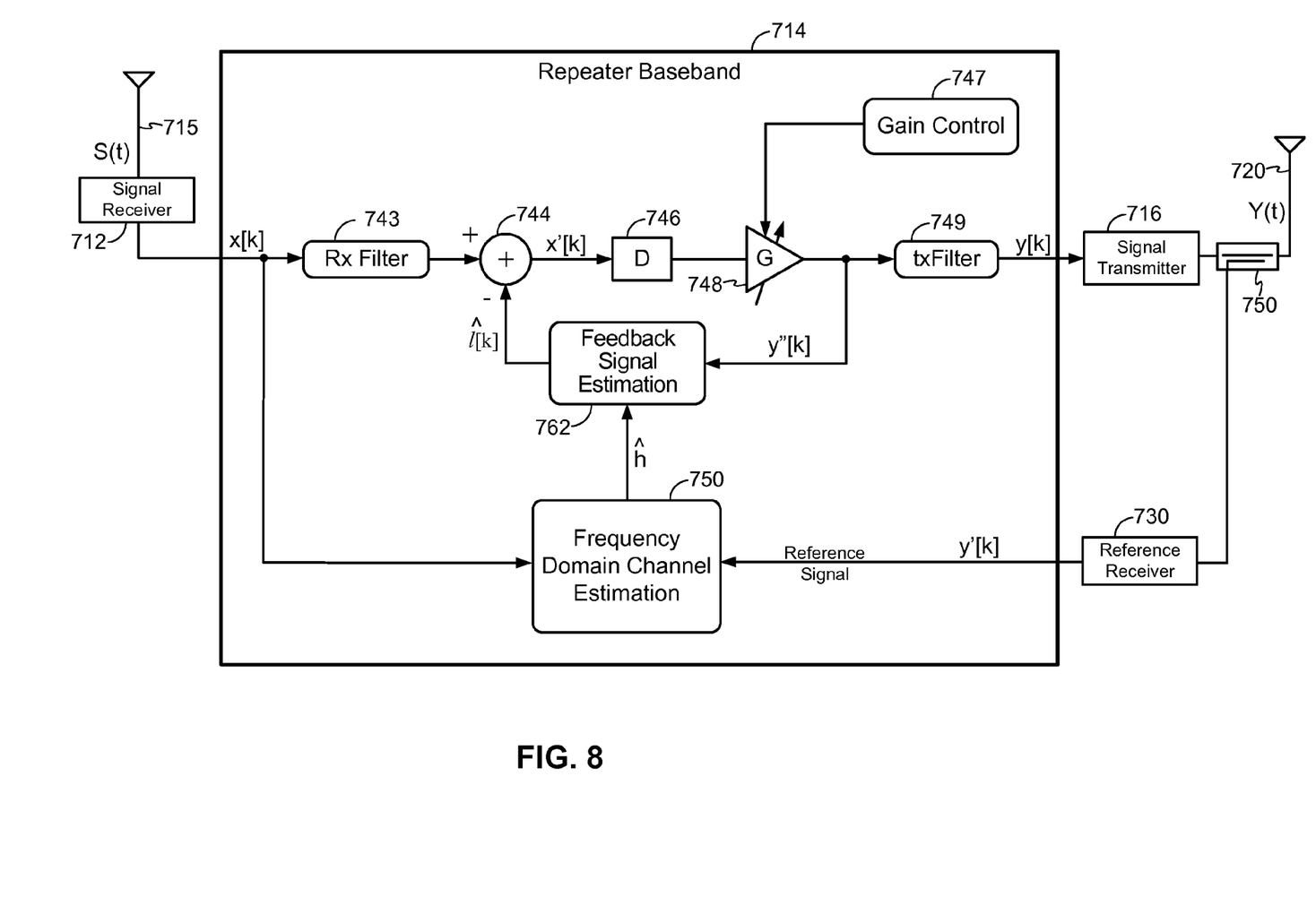
FIG. 8 is a block diagram of a repeater baseband block according to one embodiment of the present invention.

FIG. 8 is a block diagram of a repeater baseband block according to one embodiment of the present invention. Referring to FIG. 8, in repeater baseband block 714, the receive signal x[k] is coupled to a receive filter 743 ("Rx Filter") and the filtered receive signal is coupled to a summer 744 forming part of the echo-canceller. Summer 744 operates to subtract a feedback signal estimate $\hat{I}[k]$ from the filtered receive signal. As long as the feedback signal estimate is accurate, the undesired feedback signal is removed from the receive signal and echo cancellation is realized. The post cancellation signal x'[k] is coupled through a delay element 746. Delay element 746 includes a fixed delay for increasing the decorrelation of the receive and transmit signal to facilitate channel estimation. In practice, the delay provided by delay element 746 is made large enough to provide enough decorrelation but not too large to impede system functionality.

The delayed post cancellation signal is coupled to a variable gain stage 748 providing a variable gain. Variable gain stage 748 is controlled by a gain control block 747 for adjusting the gain value of the repeater. The amplified signal y"[k] (also referred to as the "digital transmit signal") is coupled to a transmit filter 649 ("Tx Filter") to generate a digital transmit signal y[k]. The digital transmit signal y[k] is then coupled to the transmitter circuit 716 outside of the repeater baseband block 714 to generate the RF transmit signal Y(t) for transmission over the server antenna 720.

Repeater baseband block 714 includes a channel estimation block 760 which operates to estimate the feedback channel of the repeater and computes an estimate of the feedback signal for the purpose of echo cancellation. In the present embodiment, the digital samples y'[k] of the RF transmit signal Y(t) are generated by a reference receiver 730 and provided to the channel estimation block 760 as the reference signal for channel estimation. That is, instead of using the digital transmit signal generated within the repeater baseband block as the channel estimation reference signal, the channel estimation block 760 receives a reference signal from outside of the repeater baseband block where the reference signal is derived from the RF transmit signal. More specifically, reference receiver 730 receives a sample of the RF transmit signal just prior to over-the-air transmission and generates a digital baseband reference signal y'[k] based on the sampled RF transmit signal. The sample of the RF transmit signal is obtained from a point after the transmitter circuit 716 outside of the repeater baseband block and through the use of a directional coupler 750, for example.

Channel estimation block 760 receives the reference signal y'[k] and also receives the receive signal x[k]. Channel estimation block 760 computes the feedback channel estimate $\hat{h}$ using a predefined channel estimation algorithm. In the present embodiment, a frequency domain channel estimation algorithm is used. The feedback channel estimate $\hat{h}$ as thus computed is coupled to a feedback signal estimation block 762. Feedback signal estimation block 762 generates the feedback signal estimate $\hat{l}[k]$ from the feedback channel estimate $\hat{h}$ and the digital transmit signal y"[k]. More specifically, feedback signal estimation block 762 performs a convolution of the feedback channel estimate $\hat{h}$ with the digital transmit signal y"[k] to generate the feedback signal estimate $\hat{l}[k]$. In the present embodiment, the feedback signal estimate is computed based on the digital transmit signal y"[k] before the transmit filter 749. The feedback signal estimate $\hat{l}[k]$ is coupled to summer 744 to be subtracted from the receive signal to realize echo-cancellation of the receive signal. According to embodiments of the present invention, the echo-cancellation realizes partial or complete cancellation of the undesired feedback signal in the receive signal.

In the present embodiment, channel estimation block 760 applies a frequency domain channel estimation algorithm. In other embodiments, other channel estimation techniques can be used, such as time domain channel estimation. In an alternate embodiment, a frequency domain closed form calculation channel estimation algorithm using minimum mean squared error (MMSE) is used. In another embodiment, a MMSE time domain channel estimation algorithm using closed form calculations for equalizer weights for use by a feedback equalizer is used. Such a channel estimation algorithm is described in U.S. Patent Publication serial no. 2008/0225929 A1, entitled "Closed form calculation of temporal equalizer weights used in repeater transmitter leakage cancellation system," which patent application is incorporated herein by reference in its entirety. In other embodiments, LMS based channel estimation algorithm can be applied.

Those skilled in the art will understand that information and signals may be represented using any of a variety of different technologies and techniques. For example: data, information, signals, bits, symbols, chips, instructions, and commands may be referenced throughout the above description. These may be represented by voltages, currents, electromagnetic waves, magnetic fields or particles, optical fields or particles, or any combination thereof.

In one or more exemplary embodiments, the functions and processes described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The term "control logic" used herein applies to software (in which functionality is implemented by instructions stored on a machine-readable medium to be executed using a processor), hardware (in which functionality is implemented using circuitry (such as logic gates), where the circuitry is configured to provide particular output for particular input, and firmware (in which functionality is implemented using re-programmable circuitry), and also applies to combinations of one or more of software, hardware, and firmware.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a memory, for example the memory of mobile station or a repeater, and executed by a processor, for example the microprocessor of modem. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored.

Also, computer instructions/code may be transmitted via signals over physical transmission media from a transmitter to a receiver. For example, if the software is transmitted from a website, server, or other remote source using a coaxial cable, fiber optic cable, twisted pair, digital subscriber line (DSL), or physical components of wireless technologies such as infrared, radio, and microwave. Combinations of the above should also be included within the scope of physical transmission media.

Moreover, the previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the features shown herein but is to be accorded the widest scope consistent with the principles and novel features disclosed herein.

What is claimed is:

1. A wireless repeater having a first antenna and a second antenna to receive an input signal and transmit an amplified signal, the input signal being a sum of a remote signal to be repeated and a feedback signal resulting from a feedback channel between the first antenna and the second antenna, the repeater comprising:
a first receiver circuit coupled to the first antenna to receive the input signal and generating a digitized input signal;
a first transmitter circuit coupled to generate the amplified signal to transmit on the second antenna based on a digitized transmit signal;
a second receiver circuit coupled to receive at least a portion of a signal to be transmitted prior to transmission over the second antenna and to generate a digitized transmit reference signal; and
a repeater baseband block coupled to the first receiver circuit, the second receiver circuit, and the first transmitter circuit, the repeater baseband block operative to receive the digitized input signal from the first receiver circuit, to access a feedback signal estimate, and to cancel the feedback signal estimate from the digitized input signal to generate the digitized transmit signal for the first transmitter circuit, the repeater baseband block including a channel estimation block to estimate the feedback channel and to provide a feedback channel estimate, the channel estimation block using the digitized transmit reference signal as a reference signal for channel estimation.

2. The wireless repeater of claim 1, wherein the second receiver circuit is coupled to receive at least a portion of the amplified signal generated by the first transmitted circuit as the signal to be transmitted.

3. The wireless repeater of claim 1, further comprising a directional coupler coupled between the first transmitter circuit and the second antenna, the second receiver circuit coupled to receive a portion of the amplified signal from the directional coupler.

4. The wireless repeater of claim 1, further comprising a splitter coupled between the first transmitter circuit and the second antenna, the second receiver circuit coupled to receive a portion of the amplified signal from the splitter.

5. The wireless repeater of claim 1, wherein the first transmitter circuit comprises a digital-to-analog converter and one or more transmitter components, and the second receiver circuit is coupled to receive at least a portion of a signal at the one or more transmitter components within the first transmitted circuit after the digital-to-analog converter as the signal to be transmitted.

6. The wireless repeater of claim 1, wherein the channel estimation block estimates the feedback channel using frequency domain channel estimation.

7. The wireless repeater of claim 1, wherein the channel estimation block estimates the feedback channel using a minimum mean squared error (MMSE) time domain channel estimation algorithm using closed form calculations for equalizer weights for use by a feedback equalizer.

8. The wireless repeater of claim 1, wherein the channel estimation block estimates the feedback channel using a LMS based channel estimation algorithm.

9. The wireless repeater of claim 1, wherein the repeater baseband block further comprises an echo canceller coupled to receive the feedback channel estimate from the channel estimation block and generate a feedback signal estimate based on the feedback channel estimate and a signal to be transmitted, the echo canceller coupled to cancel the feedback signal estimate from the input signal.

10. The wireless repeater of claim 1, wherein the first receiver circuit comprises one or more elements to receive and process the input signal, and the second receiver circuit comprises one or more of the same elements of the first receiver circuit.

11. The wireless repeater of claim 10, wherein the first receiver circuit implements a direct conversion receiver to receive and process the input signal and the second receiver circuit comprises one or more elements of the same direct conversion receiver of the first receiver circuit.

12. The wireless repeater of claim 10, wherein the first receiver circuit implements a superheterodyne receiver to receive and process the input signal and the second receiver circuit comprises one or more elements of the same superheterodyne receiver of the first receiver circuit.

13. The wireless repeater of claim 11, wherein the first receiver circuit implemented as a direct conversion receiver comprises: a low noise amplifier coupled to receive the input signal, an RF SAW filter coupled to filter the input signal, an IQ down-converter to demodulate the input signal, an image filter to filter an image frequency and an analog-to-digital converter to digitize the input signal, and the second receiver circuit includes at least an IQ down-converter, an image filter and an analog-to-digital converter.

14. The wireless repeater of claim 13, wherein the first transmitter circuit implements a direct conversion transmitter and comprises a digital-to-analog converter to convert the digitized transmit signal to an analog transmit signal, an image filter to filter the analog transmit signal, an IQ up-converter to up-convert the analog transmit signal to an RF transmit signal, an RF SAW filter to filter the RF transmit signal and a power amplifier to amplify the RF transmit signal as the amplified signal, wherein the IQ up-converter of the first transmitter circuit, the IQ down-converters and the analog-to-digital converters of the first and second receiver circuits are driven by a first local oscillator.

15. A wireless repeater having a first antenna and a second antenna to receive an input signal and transmit an amplified signal, the input signal being a sum of a remote signal to be repeated and a feedback signal resulting from a feedback channel between the first antenna and the second antenna, the repeater comprising:
first means for receiving the input signal from the first antenna and for generating a digitized input signal;
means for generating the amplified signal to transmit on the second antenna based on a digitized transmit signal;
second means for receiving at least a portion of a signal to be transmitted prior to transmission over the second antenna and generating a digitized transmit reference signal; and
means for receiving the digitized input signal from the first receiver circuit and generating the digitized transmit signal, the means including a means for estimating the feedback channel and providing a feedback channel estimate using the digitized transmit reference signal as a reference signal for channel estimation.

16. A method for providing echo cancellation in a wireless repeater in a wireless communication system, comprising:
- receiving an input signal at a first antenna of the repeater, the input signal being a sum of a remote signal to be repeated and a feedback signal resulting from a feedback channel between the first antenna and a second antenna;
- generating a digitized input signal;
- cancelling a feedback signal estimate from the digitized input signal;
- generating a digitized transmit signal based on the digitized input signal;
- generating an amplified signal based on the digitized transmit signal;
- transmitting the amplified signal on the second antenna;
- receiving at least a portion of a signal to be transmitted prior to transmission over the second antenna and generating a digitized transmit reference signal; and
- estimating a feedback channel between the first antenna and the second antenna using the digitized transmit reference signal as a reference signal for channel estimation and providing a feedback channel estimate.

17. The method of claim 16, wherein receiving at least a portion of a signal to be transmitted prior to transmission over the second antenna comprises receiving at least a portion of the amplified signal as the signal to be transmitted.

18. The method of claim 16, wherein receiving at least a portion of a signal to be transmitted prior to transmission over the second antenna comprises receiving at least a portion of a signal during the generating of the amplified signal as the signal to be transmitted.

19. The method of claim 16, wherein estimating a feedback channel comprises estimating a feedback channel using frequency domain channel estimation.

20. The method of claim 16, wherein estimating a feedback channel comprises estimating a feedback channel using a minimum mean squared error (MMSE) time domain channel estimation algorithm using closed form calculations for equalizer weights for use by a feedback equalizer.

21. The method of claim 16, wherein estimating a feedback channel comprises estimating a feedback channel using a LMS based channel estimation algorithm.

22. The method of claim 16, wherein cancelling a feedback signal estimate from the digitized input signal comprises:
- estimating a feedback signal estimate using the feedback channel estimate; and
- subtracting the feedback signal estimate from the digitized input signal.

* * * * *